UNITED STATES PATENT OFFICE.

SIEGMUND DENTLER, OF NEW YORK, N. Y., ASSIGNOR OF ONE-THIRD TO HERMAN LOEWENTHAL, OF SAME PLACE.

MANUFACTURE OF CEMENT.

SPECIFICATION forming part of Letters Patent No. 511,938, dated January 2, 1894.

Application filed August 3, 1893. Serial No. 482,301. (No specimens.)

*To all whom it may concern:*

Be it known that I, SIEGMUND DENTLER, a subject of the German Emperor, and a resident of the city of New York, in the State of New York, have invented a new and useful Process of Producing Hydraulic Cement, of which the following is a specification.

This invention relates to cements and consists of an improved process and combination of materials whereby an improved cement can be made, said improved cement equaling in strength and durability the imported Portland cement, yet very much cheaper than said Portland cement.

My improved cement also has the advantage that it can be made out of materials found and produced in this country.

First. For the manufacture of my cement I use stones containing so much carbonate of lime that they could be burned to quick-lime and be slaked; therefore all stones giving common building-lime can be used.

Second. I burn these stones in upright stoves with uninterrupted, constant heat in the same way as common building-lime is burned. After the burning I weigh the stones in order to find out how much of their weight remains and then put them in large boxes, in which they will be slaked.

Third. In the water, with which I slake the burnt stone, I put to every three hundred and fifty pounds, one pound of carbonate of potash and one pound of sulphate of copper (blue vitriol) and slake them in the same manner as a skillful workman slakes common building-lime.

Fourth. I allow for the slaking process from twelve (12) to twenty-four (24) hours, until every particle of lime in the material is slaked, provided the burning of the stone was sufficient. In this way every supplementary slaking of lime in the material is absolutely avoided.

Fifth. I manufacture bricks of the slaked material in the same manner as the common building-bricks are made, and supply the workmen with gloves, to save their hands. These bricks dry very quickly in the open air, and as soon as they are perfectly dry, I subject them to a white heat for four (4) to six (6) hours, when they assume a gray color with a touch of green.

Sixth. These gray bricks I expose to the air in a dry, covered place for some days; then they are ground to a fine powder.

Seventh. To every barrel of this powder I mix either one and one half per cent. of sulphate of iron (green vitriol) finely powdered, or one per cent. of litharge, and my cement is completed.

Some of the advantages of this cement are the following: $a$, its weight, against all other cements, made of lime or stone, as a volume of my cement powder is equal in weight to the same amount of unburnt stone; $b$, its constancy as to weight; $c$, its pertinacity of hardening to stone in the open air and under water in a short time; $d$, it never dissolves in water, nor gets brittle in the open air; $e$, its color.

The ingredients of my cement, burnt and slaked limestone, or slaked lime, carbonate of potash and sulphate of iron may be otherwise combined without departing from my invention. For instance, the sulphate of iron may be added at an earlier stage of the manufacture of the cement, as before the slaking process. So also the proportions of materials used may be varied without departing from my invention.

What I claim as new is—

1. A cement composed of slaked lime, carbonate of potash, sulphate of copper and sulphate of iron, substantially as set forth.

2. In the manufacture of cement the process of slaking quicklime which consists of adding to it a fluid containing carbonate of potash and sulphate of copper, substantially set forth.

3. The process of manufacturing cement which consists of burning stone to quicklime, slaking the same with a solution containing carbonate of potash and sulphate of copper, making bricks from said slaked material, drying the same, subjecting said dried bricks to a white heat, exposing the same to dry cool air, until they become brittle, reducing the same to powder, and mixing said powder with sulphate of iron, substantially as set forth.

In testimony that I claim the foregoing as my invention I have signed my name, in presence of two witnesses, this 2d day of August, 1893.

SIEGMUND DENTLER. [L. S.]

Witnesses:
 J. NUGENT,
 CLARENCE B. ILIFFE.